United States Patent
Zhang et al.

(10) Patent No.: US 9,629,013 B2
(45) Date of Patent: Apr. 18, 2017

(54) CHANNEL QUALITY INDICATION WITH FILTERED INTERFERENCE

(71) Applicant: MARVELL WORLD TRADE LTD., St. Michael (BB)

(72) Inventors: Yan Zhang, Palo Alto, CA (US); Yakun Sun, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 126 days.

(21) Appl. No.: 14/335,663

(22) Filed: Jul. 18, 2014

(65) Prior Publication Data
US 2015/0023193 A1    Jan. 22, 2015

Related U.S. Application Data

(60) Provisional application No. 61/847,963, filed on Jul. 18, 2013.

(51) Int. Cl.
*H04W 24/10* (2009.01)
*H04L 1/00* (2006.01)

(52) U.S. Cl.
CPC ............ *H04W 24/10* (2013.01); *H04L 1/002* (2013.01); *H04L 1/0026* (2013.01)

(58) Field of Classification Search
None
See application file for complete search history.

(56) References Cited

U.S. PATENT DOCUMENTS

| 8,934,586 | B2 * | 1/2015 | Gomez | 375/346 |
| 2005/0053129 | A1 * | 3/2005 | Yousef | H03H 21/0012 375/233 |
| 2006/0227887 | A1 * | 10/2006 | Li | H04L 25/0232 375/260 |
| 2012/0165029 | A1 * | 6/2012 | Lindbom | H04L 5/00 455/450 |

(Continued)

OTHER PUBLICATIONS

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.*, pp. 1-2695 (Mar. 29, 2012).

(Continued)

*Primary Examiner* — Ayaz Sheikh
*Assistant Examiner* — Peter Chau (57) ABSTRACT

A plurality of interference measurements are obtained at a first communication device. The interference measurements correspond to interference experienced by the first communication device. A filter is applied to the plurality of interference measurements to obtain a filtered interference measurement, wherein the filtered interference measurement is a function of a current interference measurement and one or more past interference measurements. A channel quality indicator (CQI) corresponding to a communication channel between the first communication device and a second communication device is determined based at least in part on the filtered interference measurement. The CQI is transmitted from the first communication device to the second communication device.

14 Claims, 3 Drawing Sheets

(56) References Cited

U.S. PATENT DOCUMENTS

| | | | |
|---|---|---|---|
| 2013/0310092 A1* | 11/2013 | Tabet | H04L 1/0003 455/501 |
| 2014/0066116 A1* | 3/2014 | Gao | H04W 24/10 455/509 |
| 2014/0211646 A1* | 7/2014 | Ji | H04W 24/10 370/252 |
| 2014/0301340 A1* | 10/2014 | Benjebbour | H04W 24/10 370/329 |
| 2014/0307576 A1* | 10/2014 | Nagata | H04L 1/0001 370/252 |
| 2014/0307577 A1* | 10/2014 | Benjebbour | H04W 52/243 370/252 |
| 2014/0313912 A1* | 10/2014 | Jongren | H04W 24/10 370/252 |
| 2014/0355468 A1* | 12/2014 | Li | H04W 24/10 370/252 |
| 2014/0369224 A1* | 12/2014 | Nagata | H04L 5/0053 370/252 |
| 2015/0117351 A1* | 4/2015 | Nagata | H04J 1/00 370/329 |
| 2015/0162966 A1* | 6/2015 | Kim | H04B 17/00 370/252 |
| 2015/0229452 A1* | 8/2015 | Nagata | H04L 5/0051 370/252 |
| 2015/0264594 A1* | 9/2015 | Davydov | H04W 72/12 370/252 |
| 2015/0365960 A1* | 12/2015 | Davydov | H04W 36/14 370/252 |

OTHER PUBLICATIONS

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

IEEE Std 802.16/2004 (Revision of IEEE Std 802.16-2001), "IEEE Standard for Local and metropolitan area networks; Part 16: Air Interface for Fixed Broadband Wireless Access Systems," *The Institute of Electrical and Electronics Engineers, Inc.*, 893 pages (Oct. 1, 2004).

IEEE Std 802.16/2009 (Revision of IEEE Std. 802.16-2004), IEEE Standard for Local and metropolitan area networks: Part 16: Air Interface for Broadband Wireless Access Systems, *The Institute of Electrical and Electronics Engineers, Inc.*, 2082 pages (May 29, 2009).

IEEE Std 802.16a-2003 (Amendment to IEEE Std 802.16-2001) "IEEE Standard for Local and metropolitan area networks: Part 16: Air Interface for Fixed Broadband Wireless Access Systems—Amendment 2: Medium Access Control Modifications and Additional Physical Layer Specifications for 2-11 GHZ," *The Institute of Electrical and Electronics Engineers, Inc.*, pp. 1-292 (Apr. 1, 2003).

IEEE Std 802.16e-2005 and IEEE Std 802.16-2004/Cor1-2005 (Amendment and Corrigendum to IEEE Std 802.16-2004), IEEE Standard for Local and metropolitan area networks: Part 16: Air Interface for Fixed and Mobile Broadband Wireless Access Systems: Amendment 2: Physical and Medium Access Control Layers for Combined Fixed and Mobile Operation in Licensed Bands and Corrigendum 1, *The Institute of Electrical and Electronics Engineers, Inc.*, pp. 1-864 (Feb. 28, 2006).

IEEE P802.16Rev2/D5 (Jul. 2008) (Revision of IEEE Std 802.16-2004 and consolidates material from IEEE Std 802.16e-2005, Std 802.16-2004/Cor1-2005, Std 802.16f-2005 and Std 802.16g-2007) "Draft Standard for Local and metropolitan area networks: Part 16: Air Interface for Broadband Wireless Access Systems," *The Institute of Electrical and Electronics Engineers, Inc.*, pp. 1-1970 (Jun. 2008).

IEEE Std 802.16j (Amendment to IEEE Std 802.16-2009), "IEEE Standard for Local and metropolitan area networks: Part 16: Air Interface for Broadband Wireless Access Systems—Amendment 1: Multihop Relay Specification," *The Institute of Electrical and Electronics Engineers, Inc.*, pp. 1-315 (Jun. 12, 2009).

IEEE 802.20-PD-06; IEEE P 802.20TMV14, Draft 802.20 Permanent Document; <System Requirements for IEEE 802.20 Mobile Broadband Wireless Access Systems—Version 14>, 24 pages (Jul. 16, 2004).

Ansari, et al., "Unified MIMO Pre-Coding Based on Givens Rotation," *The Institute of Electrical and Electronics Engineers*, doc. No. IEEE C802.16e-04/516r2, pp. 1-13, (Jan. 11, 2005).

Ericsson, "CQI Measurement Methodology," 3GPP Draft—TSG RAN WG1 #52—R1-080887, 7 pages (Feb. 2008).

Ericsson, "On IMR Interference Averaging," 3GPP Draft—TSG-RAN WG4 Meeting #66bis—R4-131631, 4 pages (Apr. 2013).

Eastlake et al., "Trill: Fine-Grained Labeling," Internet-Draft, 21 pages (Dec. 8, 2011).

Fischer et al., "Link Adaptation Subfield for VHT," doc. No. IEEE 802.11-10/1095r0, IEEE 802.11-10, 123rd IEEE 802.11 Wireless Local Area Networks session, Interim Meeting Session, Hilton Waikoloa Village, pp. 1-5 (Sep. 12, 2010).

Merlin et al., "VHT Control and Link Adaptation," doc. No. IEEE 802.11-11/0040r0, IEEE 802.22-11, 125th IEEE 802.11 Wireless Local Area Networks Session, Interim Meeting Session, Hyatt Century Plaza Hotel, Los Angeles, California, pp. 1-15 (Jan. 18, 2011).

Pedersen et al., "Carrier Aggregation for LTE-Advanced: Functionality and Performance Aspects," IEEE Communications Magazine, vol. 49, No. 6, pp. 89-95 (Jun. 1, 2011).

Samsung, "Simulation Results of IMR Averaging and Restriction," 3GPP Draft—3GPP TSG-RAN WG4 RAN4 #67—R4-132490, 4 pages (May 2013).

Wannstrom, "Carrier Aggregation explained," pp. 1-6 (May 2012).

Yuan et al., "Carrier Aggregation for LTE-Advanced Mobile Communication Systems," *IEEE Communications Magazine*, pp. 88-93 (Feb. 2010).

Zhang et al., "VHT Link Adaptations," doc. No. IEEE802.11-11/0047r0, IEEE 802.11-11, 125th IEEE 802.11 Wireless Local Area Networks Session, Interim Meeting Session, Hyatt Century Plaza Hotel, Los Angeles, California, pp. 1-11 (Jan. 18, 2011).

"Technical White Paper: Long Term Evolution (LTE): A Technical Overview", Motorola, 15 pages (2007).

3GPP TR 36.816 V11.2.0, "3rd Generation Partnership Project; Technical Specification Group Radio Access Network; Evolved Universal Terrestrial Radio Access (E-UTRA); Study on Signaling and Procedure for Interference Avoidance for In-Device Coexistence (Release 11)", 44 pages (Dec. 2011).

3GPP TS 23.122 V9.5.0, "3rd Generation Partnership Project; Technical Specification Group Core Network and Terminals; Non-Access-Stratum (NAS) functions related to Mobile Station (MS) in idle mode (Release 9)", 42 pages (Dec. 2010).

3GPP TS 23.203 V10.6.0, "3rd Generation Partnership Project; Technical Specification Group Services and System Aspects; Policy and Charging Control Architecture (Release 10)", 131 pages (Mar. 2012).

3GPP TS 24.301 V9.5.0, "3rd Generation Partnership Project; Technical Specification Group Core Network and Terminals; Non-Access-Stratum (NAS) for Evolved Packet System (EPS); Stage 3 (Release 9)", 297 pages (Dec. 2010).

3GPP TS 36.211 V10.4.0, "3rd Generation Partnership Project; Technical Specification Group Radio Access Network; Evolved Universal Terrestrial Radio Access (E-UTRA); Physical Channels and Modulation (Release 10)", 101 pages (Dec. 2011).

3GPP TS 36.213 V10.4.0, 3rd Generation Partnership Project; Technical Specification Group Radio Access Network; Evolved Universal Terrestrial Radio Access (E-UTRA); Physical Layer Procedures (Release 10), 125 pages (Dec. 2011).

3GPP TS 36.213 V10.5.0, 3rd Generation Partnership Project; Technical Specification Group Radio Access Network; Evolved Universal Terrestrial Radio Access (E-UTRA); Physical Layer Procedures (Release 10), 125 pages (Mar. 2012).

(56) References Cited

OTHER PUBLICATIONS

3GPP TS 36.300 V8.12.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 149 pages (Mar. 2010).

3GPP TS 36.300 V11.1.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 194 pages (Mar. 2012).

3GPP TS 36.304 V9.5.0, "3rd Generation Partnership Project; Technical Specification Group Radio Access Network; Evolved Universal Terrestrial Radio Access (E-UTRA); User Equipment (UE) procedures in idle mode (Release 9)", 32 pages (Dec. 2010).

3GPP TS 36.331 V10.4.0, "3rd Generation Partnership Project; Technical Specification Group Radio Access Network; Evolved Universal Terrestrial Radio Access (E-UTRA); Radio Resource Control (RRC); Protocol Specification (Release 10)", 296 pages (Dec. 2011).

International Search Report and Written Opinion on corresponding PCT Application No. PCT/US2014/047288, dated Oct. 22, 2014 (12 pages).

IEEE Std 802.16™-2012 (Revision of IEEE Std. 802.16-2009), IEEE Standard for Air Interface for Broadband Wireless Access Systems: Part 1—Beginning through Section 7, IEEE Computer Society and the IEEE Microwave Theory and Techniques Society, *The Institute of Electrical and Electronics Engineers, Inc.*, 2558 pages (Aug. 17, 2012).

International Preliminary Report on Patentability in International Application No. PCT/US2014/047288, dated Jan. 28, 2016 (9 pages).

\* cited by examiner

CHANNEL QUALITY INDICATION WITH FILTERED INTERFERENCE

CROSS-REFERENCES TO RELATED APPLICATIONS

This disclosure claims the benefit of U.S. Provisional Patent Application No. 61/847,963, entitled "Advanced Receiver design for CSI feedback," filed on Jul. 18, 2013, which is incorporated herein by reference in its entirety.

FIELD OF THE DISCLOSURE

The present disclosure relates generally to wireless communications, and more particularly, to obtaining characteristics of a wireless communication channel.

BACKGROUND

Wireless communication systems often utilize characteristics of wireless communication channels between communication devices, for example for resource allocation, communication parameters selection and the like, to be used for communication with the corresponding communication devices. Such channel characteristics, in some systems, are obtained by a receiving communication device and an indication of the channel characteristics, such as channel state information, is then transmitted to a transmitting communication device. The transmitting communication device may use the channel characteristics to select communication parameters for transmissions to the receiving device. The channel characteristics, however, can vary greatly with time and frequency, and the channel characteristics indication may not be an accurate reflection of the communication channel at the time the indication is received by the transmitting device.

In cellular communication systems, channel characteristics indications may be particularly inaccurate due to relatively high levels of variance of interference in the communication channel from interfering communication device that are operating in neighboring cells.

SUMMARY

In an embodiment, a method includes obtaining, at a first communication device, a plurality of interference measurements corresponding to interference experienced by the first communication device. The method also includes applying a filter to the plurality of interference measurements to obtain a filtered interference measurement, wherein the filtered interference measurement is a function of a current interference measurement and one or more past interference measurements. The method additionally includes determining, based at least in part on the filtered interference measurement, a channel quality indicator (CQI) corresponding to a communication channel between the first communication device and a second communication device. The method further includes transmitting the CQI from the first communication device to the second communication device.

In another embodiment, a first communication device comprises a network interface device configured to obtain a plurality of interference measurements corresponding to interference experienced by the first communication device. The network interface is further configured to apply a filter to the plurality of interference measurements to obtain a filtered interference measurement, wherein the filtered interference measurement is a function of a current interference measurement and one or more past interference measurements. The network interface is further still configured to determine, based at least in part on the filtered interference measurement a channel quality indicator (CQI) associated with a communication channel between the first communication device and a second communication device. The network interface is further yet configured to transmit the CQI from the first communication device to the second communication device.

DETAILED DESCRIPTION

In embodiments described below, a first wireless communication device such as an evolved node base device (eNB) of a communication network transmits to and receives from a second wireless communication device, such as a user equipment device (UE). eNB and UE correspond to terminology used in the $3^{rd}$ Generation Partnership Project Long Term Evolution (3GPP LTE) Standard. The apparatus and methods discussed herein, however, are not limited to 3GPP LTE networks. Rather, the apparatus and methods discussed herein may be utilized in other types of wireless communication networks as well. For instance, another example system that may utilize embodiments of apparatus and methods described herein is a technology promulgated by the Worldwide Interoperability for Microwave Access (WiMAX) Forum (such systems conform to the Institute for Electrical and Electronics Engineers (IEEE) 802.16e Standard). In WiMAX, a base station (BS) corresponds to the eNB of 3GPP LTE, and a mobile station (MS) corresponds to the UE. In other embodiments, other types of systems may utilize apparatus and methods described herein such as communication systems that conform to one or more of the IEEE 802.16 Standards, wireless local area network (WLAN) systems such as systems that conform to one or more of IEEE 802.11 Standards, etc. For ease of explanation, however, the description below refers to base stations (e.g., eNBs) and client stations (e.g., UEs).

Figure 1:
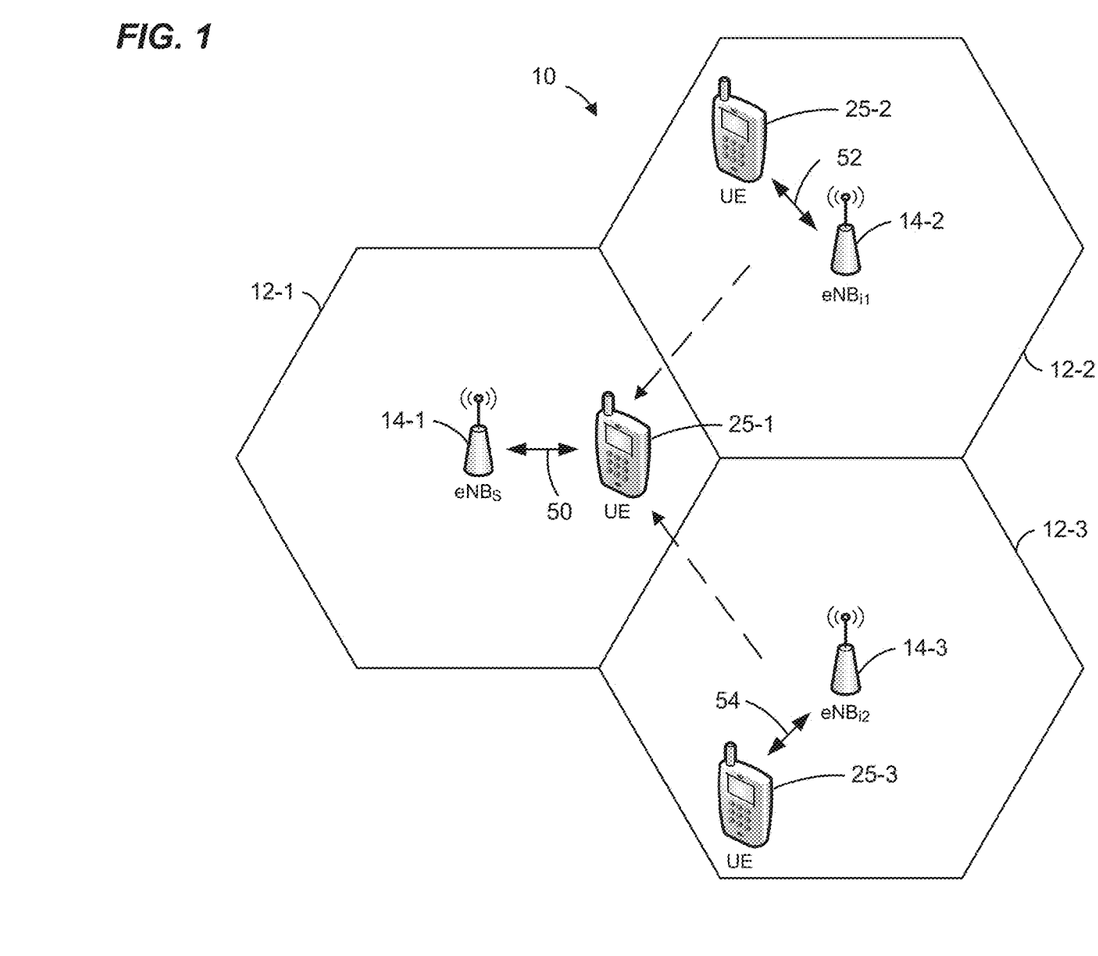
FIG. 1 is a block diagram of an example system in which a client station computes a channel quality indicator (CQI) based at least in part on a filtered measurement of interference, according to an embodiment.

FIG. 1 is a block diagram of an example wireless communication network 10, according to an embodiment. The network 10 includes a plurality of cells 12, each of the cells 12 served by a base stations 14. For example, a base station 14-1 serves a cell 12-1; a base station 14-2 serves a cell 12-2; and a base station 14-3 a cell 12-3. The network 10 also includes one or more client stations 25, each client station 25 operating in a particular cell 12 and communicating with the base station 14 that serves the particular cell via a communication channel between the client station 24 and the base station 14. For example, a client station 25-1 operates in the cell 12-1 and communicates with the base station 14-1 via a communication channel 50, a client station 25-2 operates in the cell 12-2 and communicates with the base station 14-2 via a communication channel 52, and a client station 25-3 operates in the cell 12-3 and communicates with the base station 14-3 via a communication channel 54, in the illustrated embodiment and scenario.

Although three cells 12 and three base stations 14 are illustrated in FIG. 1 for clarity, typically systems can include many more cells 12 and base stations 14. Although in the embodiment and scenario illustrated in FIG. 1 one client station 25 is operating in each of the cells 12, a cell 12 can generally include other suitable numbers (e.g., 0, 2, 3, 4, 5, 6, 7, etc.) of client stations 25, in other embodiments and/or scenarios.

In an embodiment, a base station 14 communicates with a client station 25 using communication parameters determined based on characteristics of the communication channel between the base station 14 and the client station 25. In an embodiment, a client station 25 measures the communication channel between the base station 14 and the client station 25 and reports, in some form, information characterizing the communication channel to the base station 14. The base station 14 utilizes the information received from the client station 25 to determined communication parameters for communicating with the client station 25, for example to schedule sub-frames, within a frame, during which to communicate with the client station 25, to select appropriate modulation and/or coding parameters for transmitting data to the client station 25, etc., in an embodiment.

In an embodiment, to allow a base station 14 (e.g., the base station 14-1) to determine appropriate parameters for use in communicating with a client station 25 (e.g., the client station 25-1), the client station 25-1 determines channel state information (CSI) corresponding to the communication channel 50 between the base station 14-1 and the client station 25-1. In an embodiment, the CSI includes an indicator of channel quality, such as a channel quality indicator (CQI). The CQI is based on (i) channel response of the communication channel 50 and (ii) interference, such as interference from interfering channel(s) (illustrated in FIG. 1 by dashed arrows), seen at the client station 25-1, in an embodiment. In an embodiment, the CQI is a function of (i) an estimate of a channel response characterizing channel response of the communication channel 50 and (ii) measured interference plus noise seen at the client station 25-1. The client station 25-1 obtains a CQI at time t, and transmits the CQI to the base station 14-1, in an embodiment. The base station 14-1 receives the CQI at time t+Δt, where Δt corresponds to the travel time in the communication channel 50. The base station 14-1 utilizes the CQI received from the client station 25-1 to schedule communications with the client station 25-1, to determine communication parameters for communicating with the client station 25-1, to perform link adaptation (e.g., to adjust communication parameters) for the communication link to the client station 25-1, etc., in an embodiment.

In at least some embodiments, interference seen at the client station 25-1 from communication devices operating in the cells 12-2, 12-3 can vary significantly at different times and/or and different frequencies within the operating bandwidth of the client station 25-1. In some embodiments, the system 10 utilizes orthogonal frequency division multiplexing (OFDM). In some embodiments, communications between the base stations 14-2,14-3 and respective client stations 25-2, 25-3 served by the base stations 14-2, 14-3 are scheduled for one or more particular resource elements. Such scheduling results in variance of interference, seen at the client station 25-1, caused by communications between interfering base station 14 and client stations 25, in at least some embodiments. In other words, due to scheduling of communication for interfering devices, the client station 25-1 may experience different levels of interference in different one of the resource elements, in some embodiments and/or scenarios. Further, in at least some embodiments, the system 10 utilizes multiple-input multiple-output (MIMO) communications with one or more of the client stations 25. In some such embodiments, one or more of the base stations 14 and/or one or more of the client stations 25 apply pre-coding vectors or matrices to signals to be transmitted from the base stations 14 and/or client stations 25 to shape the transmissions so as to maximize transmit power in certain directions. An interfering device (e.g., an interfering base station 14) may utilize different pre-coding vectors for different resource elements, which may result in time and/or frequency variance of interference at the client station 25-1 caused by the interfering device, in an embodiment.

Due at least in part to such variations in interference seen at the client station 25-1, when CQI associated with the communication channel 50 at time t is received by the base station 14-1 at time t+Δt, the received CQI no longer reflects channel quality of the communication channel 50, at least with respect to interference experienced by the station 25-1, in at least some embodiments. Thus, the base station 14-1 may determine, based on the received CQI, sub-optimal communication parameters for communicating with the client station 25-1, in such embodiments. For example, if the received CQI corresponds to high level of interference at the client station 25-1, the base station 14-1 may select a modulation and coding scheme (MCS) with relatively low modulation depth (e.g., binary phase-shift keying (BPSK) or quadrature phase-shift keying (QPSK) modulation) and/or relatively low coding rate, which modulation and coding scheme may result in relatively low throughput on the communication channel 50. However, when the base station 14-1 transmits data to the client station 25-1 using the selected modulation and coding scheme, interference at the client station 25-1 may be significantly lower than interference indicated by the CQI that the base station 14-1 received from the client station 25-1, in an embodiment. The loss in throughput in the communication channel 50 may not be necessary, in this situation. As another example, an MCS that results in a relatively high throughput may be selected if a received CQI corresponds to a relatively low level of interference at the client station 25-1, and the selected MCS may lead to high error rate and/or high packet loss if interference is significantly higher at the time that data is being transmitted to the client station 25-1, in an embodiment.

In some embodiments described below, the client station 25-1 obtains an averaged or a filtered measure of interference experienced by the client station 25-1, and generates CQI based on the filtered measure of interference. The filtered measure of interference results in a more reliable "long term" representation of CQI, in at least some embodiments and/or scenarios. In some embodiments, the client station 25-1 obtains the filtered measure of interference by applying a recursive filter to a current interference measurement and one or more past interference measurements. As will be explained in more detail below, to further improve long-term reliability of CQI, in some such embodiments, the client station 25-1 adapts the recursive filter based on one or more factors that may affect reliability of interference measurements at the client station 25-1. For example, in an embodiment, if the client station 25-1 determines that interference measurements are expected to be relatively stable over time, then the client station 25-1 adapts the filter to increase contribution of the current interference measurement and to decrease contribution of past interference measurement(s), in an embodiment. Conversely, if the client station 25-1 determines that interference measurements are expected to be varying with time, the client station 25-1 adapts the filter to decrease contribution of the current interference measurement and to increase contribution of past interference measurement(s), in an embodiment.

In an embodiment, the system 10 operates in accordance with the 3GPP Long-Term Evolution Advanced (LTE-A) specifications. In other embodiments, however, the system 10 operates in accordance with any other suitable communication standard or protocol. For example, the disclosed techniques can also be applied in Wi-Fi systems operating in accordance with one or more of the IEEE 802.11 specifications or in WiMAX systems operating in accordance with the IEEE 802.16m specifications.

Figure 2:
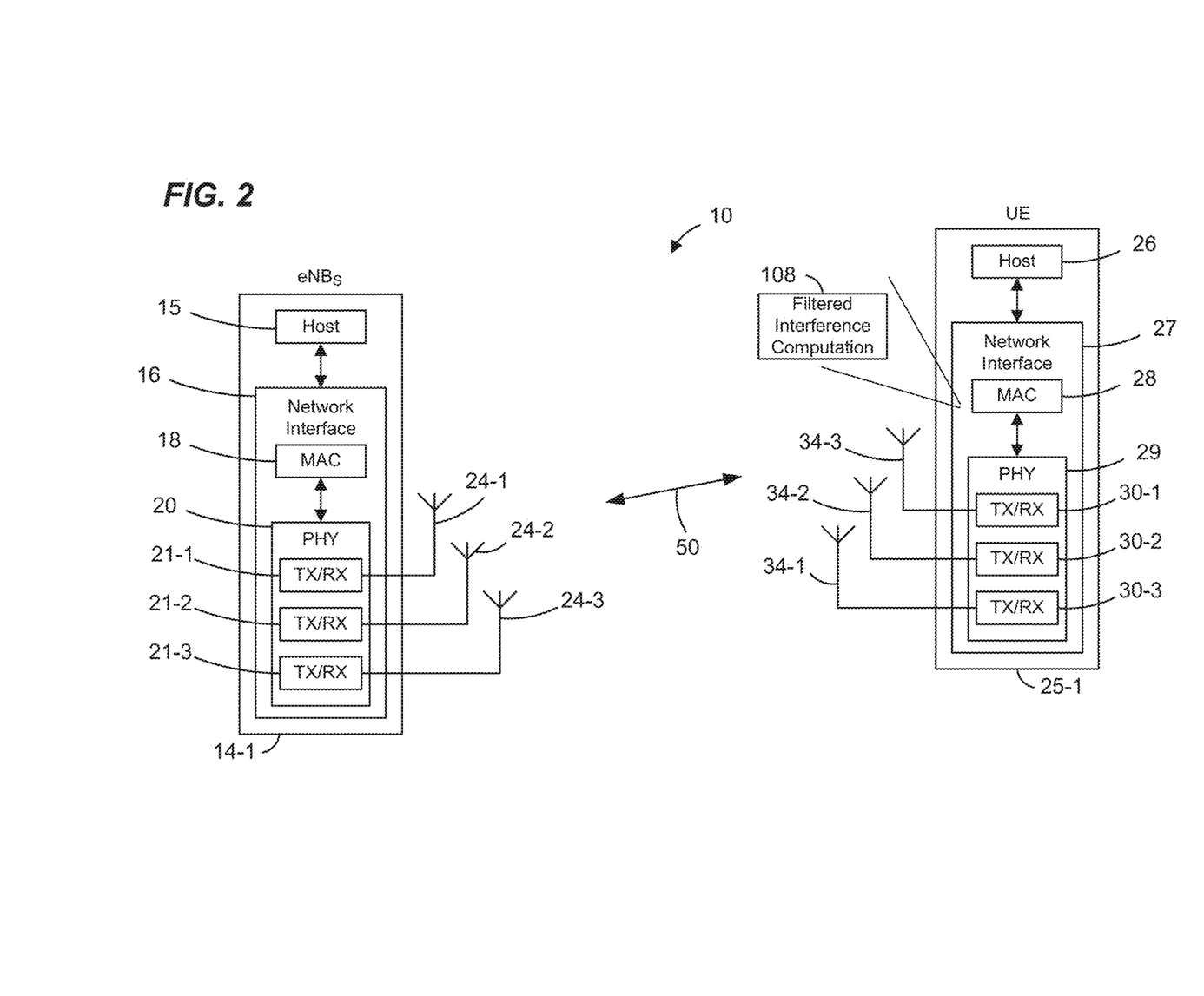
FIG. 2 is a block diagram of another example system in which a client station computes a channel quality indicator (CQI) based at least in part on a filtered measurement of interference, according to an embodiment.

FIG. 2 is another block diagram of the example wireless communication network 10, according to an embodiment. The base station 14-1 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 2, the base station 14-1 can include different suitable numbers (e.g., 2, 4, 5, etc.) of transceivers 21 and antennas 24 in other embodiments. In some embodiments, multiple transceivers 21 are coupled to the same antenna and antenna selection is utilized. Thus, in some embodiments, the number of antennas 24 is not the same as the number of transceivers 21. Additionally, in some embodiments, the base station 14-1 is configured to utilize antenna diversity, antenna beamforming, and/or a multiple input, multiple output (MIMO) technique such as spatial multiplexing.

In various embodiments, one or both of the base stations 14-2 and 14-3 have a structure the same as or similar to the base station 14-1.

The client station UE 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 2, the client station 25-1 can include different numbers (e.g., 2, 4, 5, etc.) of transceivers 30 and antennas 34 in other embodiments. In some embodiments, multiple transceivers 30 are coupled to the same antenna and antenna selection is utilized. Thus, in some embodiments, the number of antennas 34 is not the same as the number of transceivers 30. Additionally, in some embodiments, the client station 25-1 is configured to utilize antenna diversity, antenna beamforming, and/or a multiple input, multiple output (MIMO) technique such as spatial multiplexing.

In various embodiments, one or both of the client stations 25-2 and 25-3 have a structure the same as or similar to the client station 25-1.

In some embodiments, the network interface 27 of the client station 25-1 is configured to compute a filtered interference measure corresponding to interference at the client station 25-1, and to generate CQI based on the filtered interference measure. The network interface 27 of the client station 25-1 is configured to then cause the CQI to be transmitted to the base station 14-1. The base station 14-1 is configured to receive the CQI and to determine communication parameters for communicating with the client station 25-1 based on the CQI. Because the CQI is generated based on filtered interference, the CQI provides a more accurate and reliable long term channel quality indication as compared to a CQI generated based on instantaneous interference measurements, in at least some embodiments and scenarios.

In an embodiment, the network interface 27 of the client station 25-1 includes a filtered interference computation module 108 configured to compute filtered interference measure. For example, the filtered interference computation module 108 uses a recursive filter to compute the filtered interference measure based on a current, or latest, measurement of interference and one or more past measurements of interference obtained at the client station 25-1.

In an embodiment, the filtered interference computation module 108 is included in the PHY processing device 29. In an embodiment, the filtered interference computation module 108 is included in the MAC processing device 28. In an embodiment, the filtered interference computation module 108 is not included in either the PHY processing device 29 or the MAC processing device 28.

In an embodiment, CQI generated by the network interface 27 includes a channel estimate component and a filtered interference measure component. In an embodiment, CQI generated by the network interface 27 can mathematically be written as $$CQI(t,k) = f(H(t,k), \tilde{N}(t,k)) \quad \text{Equation 1}$$

In Equation 1, H(t,k) is a channel estimate corresponding to the communication channel 50, $\tilde{N}(t,k)$ is filtered interference measure obtained at the client station 25-1, t is an index corresponding to time, and k is an index corresponding to frequency. In an embodiment, the network interface 27 is configured to obtain the filtered interference measure $\tilde{N}(t,k)$ by applying time and frequency filtering to a set of interference measurements. In mathematical terms, in an embodiment, $\tilde{N}(t,k)$ is expressed as $$\tilde{N}(t,k)=g(N(t,k-k_l),N(t-1,k-k_l),\ldots,N(t-\tau,k-k_l),\ldots,$$
$$N(t,k),N(t-1,k),\ldots,N(t-\tau,k),\ldots,N(t,k+k_r),N$$
$$(t-1,k+k_r),\ldots,N(t-\tau,k+k_r))$$
Equation 2 where $k_l$ and $k_r$ define a frequency averaging interval, and $\tau$ defines a time averaging interval, and g( ) is a particular filtering function being utilized.

In an embodiment, the network interface 27 is configured to use a recursive filtering function to obtain the filtered interference measure. An example recursive filtering function, used in an example embodiment, can be written as $$\tilde{N}(t+1,k)=\alpha(t,k)\tilde{N}(t,k)+(1-\alpha(t,k))\hat{N}(t+1,k)$$
Equation 3

In an embodiment, $\hat{N}(t+1,k)$ in Equation 3 is defined as $$\hat{N}(t+1,k) = \sum_{s=-k_l}^{k_r} q_s N(t+1,k+s)$$
Equation 4

In Equations 3 and 4, $\alpha(t,k)$ is a frequency and time dependent recursive filter coefficient, $\hat{N}(t,k)$ is a frequency domain filtered interference measure over a frequency range defined by $(k-k_l,k+k_r)$, and $q_s$ is a frequency domain filter coefficient at the frequency k+s. In an embodiment, particular values of $k_l$, $k_r$, and $q_s$ are selected based on correlations of interference level, in frequency domain, at the client station 25-1.

In an embodiment, the network interface 27 is configured to use time domain filtering, and to ignore frequency domain filtering, when obtaining the filtered interference measure. In this embodiment, Equation 4 can be written as $$\hat{N}(t+1,k)=N(t+1,k)$$
Equation 5

In an embodiment, the network interface 27 is configured to adapt the coefficient $\alpha(t,k)$ based on one or more factors (e.g., channel statistics of interfering channel(s)) that may affect interference experienced by the client station 25-1. In an embodiment, the network interface 27 utilizes interfering channel characteristics to determine an interfering channel scenario indicative of reliability of interference measurements at the client station 25-1, and adapts the coefficient $\alpha(t,k)$ in accordance with the interfering channel scenario. The interfering channel scenario is based on any combination of one or more of (i) Doppler spread associated with interfering channel(s), (ii) signal to noise plus interference (SINR) measured at the client station 25-1, (iii) spatial correlation associated with interfering channel(s), and (iv) level and/or degree of variance of interference at the client station 25-1.

For example, in an embodiment, the network interface 27 is configured to increase the value of the recursive filter coefficient $\alpha(t,k)$ when interference measurements are generally expected to have relatively low reliability, as indicated by relatively high Doppler spread associated with interfering channel(s) and/or relatively high spatial correlation associated with interfering channel(s) and/or relatively low level of interference compared to signal level at the client station 25-1. Conversely, in an embodiment, the network interface 27 is configured to decrease the value of the recursive filter coefficient $\alpha(t,k)$ when interference measurements are generally expected to have relatively high reliability, as indicated by relatively low Doppler spread associated with interfering channel(s) and/or relatively low spatial correlation in associated with interfering communication channel(s) and/or relatively high level of interference compared to signal level at the client station 25-1. As another example, the network interface 27 is configured to leave the value of the recursive filter coefficient $\alpha(t,k)$ unchanged (e.g., stop adjusting the value) when the network interface 27 detects that interference at the client station 25-1 is very low or nonexistent, or that interference is static, in an embodiment.

The network interface 27 is configured to adapt the recursive filter coefficient $\alpha(t,k)$ by adjusting the recursive filter coefficient $\alpha(t,k)$ in the direction of an optimal value of the $\alpha(t,k)$ for the particular interfering channel scenario, or by setting the recursive filter coefficient $\alpha(t,k)$ an optimal value of the $\alpha(t,k)$ for the particular interfering channel scenario, as will be explained in more detail below, in various embodiments and/or scenarios. Optimal values of the recursive filter coefficient $\alpha(t,k)$ are empirically determined and stored in a memory in the network interface 27, for example, in an embodiment.

In mathematical terms, in an embodiment, the recursive filter coefficient $\alpha(t,k)$ can be written as a function h of the current interference measurements $N(t,k)$, past interference measurements $\tilde{N}(t-1,k)$, channel spatial correlation $h_{sc}$, Doppler spread $f_d$ and received signal to noise and interference ratio SINR(t,k), as shown in Equation 6.

$$\alpha(t,k)=h(\tilde{N}(t-1,k),N(t,k),h_{sc},f_d,SINR(t,k))$$
Equation 6

In an embodiment, the network interface 27 is configured to adapt the recursive filter coefficient $\alpha$ as a function of time, with the various factors discussed above varying over time. In this embodiment, the recursive filter coefficient $\alpha(t)$ can be written as a function h of the current interference measurements N(t), past interference measurements $\tilde{N}(t-1)$, channel spatial correlation $h_{sc}$, Doppler spread $f_d$ and received signal to noise and interference ratio SINR(t) as shown in Equation 7.

$$\alpha(t)=h(\tilde{N}(t-1),N(t),h_{sc},f_d,SINR(t))$$
Equation 7

In this case, the interference measurements $\tilde{N}(t)$ and N(t) are wideband interference measurements over the whole channel bandwidth, or a certain portion of the channel bandwidth, in various embodiments.

Generally speaking, relatively larger values of the coefficient $\alpha$ adjust the recursive filter in the direction of relying more on the past interference measurements and relatively smaller values of the coefficient $\alpha$ adjust the recursive filter in the direction of relying more on the current, or the latest, interference measurement.

Depending on the embodiment, the channel factors or characteristics needed for adapting the recursive filter coefficient α are obtained by the client station 25-1 directly, based on measurements performed by the client station 25-1 and/or are obtained by the client station 25-1 via information, such as assistance information, received by the client station 25-1 from another communication device, such as the base station 14-1 or a higher level network controller device (not shown in FIG. 1). In some embodiments, for example, the client station 25-1 (e.g., the network interface 27 of the client station 25-1) derives at least some of the channel characteristic needed for adapting the recursive filter coefficient α from interference measurements performed by the client station 25-1. For example, Doppler spread and/or spatial correlation associated with interfering communication channel(s) is obtained from the filtered interference measure $\tilde{N}(t,k)$, in some embodiments. In another embodiment, the network interface 27 is configured to obtain a covariance matrix of noise plus interference at the client station 25-1 and to use the covariance matrix to determine expected reliability of interference measurements at the client station 25-1. As an example, in an embodiment in which the client station 25-1 includes two antennas 34, the network interface 27 obtains a 2×2 interference plus noise covariance matrix given as $$N(t,k) = \begin{bmatrix} n_{1,1}(t,k) & n_{1,2}(t,k) \\ n_{2,1}(t,k) & n_{2,2}(t,k) \end{bmatrix} \quad \text{Equation 8}$$

The network interface 27 then computes a ratio of off-diagonal elements of the covariance matrix to diagonal elements of the covariance matrix, in an embodiment. For example, in the 2×2 covariance matrix case discussed above, in an embodiment, the network interface 27 is configured to compute a magnitude of a ratio of an off-diagonal element to the diagonal elements of the matrix according to $$|r_n(t,k)| = |n_{1,2}(t,k)/\sqrt{n_{1,1}(t,k)n_{2,2}(t,k)}| \quad \text{Equation 9}$$

The network interface 27 is also configured to compute a phase of a ratio of an off-diagonal element to the diagonal elements of the matrix according to $$\angle r_n(t,k) = \text{angle}(n_{1,2}(t,k)/\sqrt{n_{1,1}(t,k)n_{2,2}(t,k)}) \quad \text{Equation 10}$$

In an embodiment, the network interface 27 is then configured to compute, using the phase ratios computed, for example, according to the Equation 10, a delta phase $\Delta\angle r_n(t,k)$ as a difference between two consecutively computed phase ratios according to $$\Delta\angle r_n(t,k) = \quad \text{Equation 11}$$
$$\begin{cases} |\angle r_n(t,k) - \angle r_n(t-1,k)| & -\pi < \angle r_n(t,k) - \angle r_n(t-1,k) < \pi \\ 2\pi - (\angle r_n(t,k) - \angle r_n(t-1,k)) & \angle r_n(t,k) - \angle r_n(t-1,k) \geq \pi \\ 2\pi + (\angle r_n(t,k) - \angle r_n(t-1,k)) & \angle r_n(t,k) - \angle r_n(t-1,k) \leq -\pi \end{cases}$$

In an embodiment, the network interface 27 is configured to assume highly spatially correlated interfering communication channel scenario if one or both of (i) the computed $\angle r_n(t,k)$ is below a threshold θ and (ii) the computed $\Delta\angle r_n(t,k)$ is below a threshold $\theta_{delta}$. In an embodiment, the threshold θ and/or the threshold $\theta_{delta}$ are predetermined thresholds. In an embodiment, if the network interface 27 determines high spatially correlation in interfering channel scenario, then the network interface 27 adapts the recursive filter coefficient α by adjusting the coefficient α in the direction of an optimal coefficient α for a highly spatially correlated interfering channel scenario, in an embodiment.

In some embodiments, the network interface 27, in addition or instead of computing a magnitude and/or phase of the ratios of the off-diagonal elements of to the diagonal elements of the covariance matrix, is configured to compute filtered magnitude and/or phase of these ratios based on interference plus noise covariance matrices corresponding to multiple times, according to Equations 12 and 13 below, respectively.

$$|\tilde{r}_n(t+1,k)| = \beta|\tilde{r}_n(t,k)| + (1-\beta)|r_n(t,k)| \quad \text{Equation 12}$$

$$\angle\tilde{r}_n(t+1,k) = \gamma\angle\tilde{r}_n(t,k) + (1-\gamma)\angle r_n(t,k) \quad \text{Equation 13}$$

Constants β and γ in Equations 12 and 13, respectively, have predetermined values, in an embodiment. Filtered magnitude and/or phase covariance characteristics improve robustness of CQI recursive filter adaptation, in at least some embodiments and/or scenarios. The network interface 27 is configured to then compute a phase delta $\Delta\angle\tilde{r}_n(t,k)$ according Equation 13, but using two consecutively computed filtered phase ratios $\angle\tilde{r}_n(t,k)$ rather than two consecutively computed unfiltered phase ratios $\angle r_n(t,k)$, in an embodiment. The network interface 27 is configured to detect highly spatially correlated interfering channel scenario when one or both of (i) the computed $\angle\tilde{r}_n(t,k)$ is below a threshold θ and (ii) the computed $\angle\tilde{r}_n(t,k)$ is below a threshold $\theta_{delta}$, an embodiment. In an embodiment, the threshold θ and/or the threshold $\theta_{delta}$ are predetermined thresholds. In an embodiment, if the network interface 27 detects a highly correlated interfering channel scenario, then the network interface 27 adapts the recursive filter coefficient α by adjusting the coefficient α in the direction of an optimal coefficient α for a highly spatially correlated communication channel scenario, in an embodiment.

In an embodiment, upon detecting a particular interfering channel scenario, the network interface 27 adapts the recursive filter coefficient α by adjusting the coefficient α in the direction of an optimal coefficient α for the detected interfering channel scenario. Adjustment of the coefficient can be discrete (e.g., step-wise) or continuous, depending on the embodiment. As an example, in an embodiment, a discrete adjustment is performed according to $$\alpha(t+1,k) = \quad \text{Equation 14}$$
$$\begin{cases} \min(\alpha(t,k) + \alpha_{step}, \alpha_{max}(r_n, h_{sc}, f_d, SINR)) & \alpha(t,k) < \omega_{opt}(r_n, h_{sc}, f_d, SINR) \\ \max(\alpha(t,k) - \alpha_{step}, \alpha_{min}(r_n, h_{sc}, f_d, SINR)) & \alpha(t,k) \geq \omega_{opt}(r_n, h_{sc}, f_d, SINR) \end{cases}$$

where $\omega_{opt}(r_n,h_{sc},f_d,SINR)$ is an optimal value of the coefficient $\alpha$ for a particular interfering channel scenario. In an embodiment, the recursive filter coefficient is initially set to a suitable value, such as $\alpha=0.5$, for example, or another suitable value. The value of $\alpha$ is then adjusted, using a suitable (e.g., predetermined) value $\alpha_{step}$, based on the detected interfering channel scenario, in an embodiment. In an example embodiment, if $|r_n(t,k)|<\sigma_0$, where $\sigma_0$ is a threshold value, indicating that interference at the client station 25-1 is small or non-existent, then the network interface 27 increases the value of the recursive filter coefficient $\alpha$ until an optimal value of the coefficient $\alpha$ for low interference channel scenario is reached, in an embodiment. Similarly, if high Doppler spread is detected, then the network interface 27 increases the value of the recursive filter coefficient $\alpha$ until an optimal value of the coefficient $\alpha$ for high Doppler spread channel scenario is reached, in an embodiment. As another example, in an embodiment, if $SINR(t,k)$ is above a threshold value $\gamma_0$, then the network interface 27 increases the value of the recursive filter coefficient $\alpha$ until an optimal value of the coefficient $\alpha$ for low interference relative to signal power scenario. As yet another example, in an embodiment, if relatively high level interference is detected, then the network interface obtains a measure of spatial correlation associated with the interfering communication channel(s), and adapts the recursive filter coefficient $\alpha$ according to the measure of spatial correlation until an optimal value of the coefficient $\alpha$ for the corresponding spatial correlation scenario (e.g., low spatial correlation of high spatial correlation) is reached.

In another embodiment, a continuous function is utilized to adapt the recursive filter coefficient $\alpha$ based on the particular detected interfering channel scenario. For example, in such embodiment, the network interface 27 is configured to adapt the recursive filter coefficient $\alpha$ according to $$\alpha(t+1,k)=\max(\min(\alpha(t,k)+f(t,k),\alpha_{max}),\alpha_{min}) \quad \text{Equation 15}$$

where $f(t,k)$ is a suitable function of one or more factors that correspond to interference seen at the client station 25-1. For example, the network interface 27 is configured to determine the $f(t,k)$ based on one or more of (i) interference measurements at the client station 25-1, (ii) SINR measured at the client station 25-1, and (iii) Doppler spread of interfering channel(s). Mathematically, in an example embodiment, the function $f(t,k)$ in Equation 15 can be written as $$f(t,k)=f_{r_n}(t,k)+f_{f_d}(t,k)+f_{SINR}(t,k) \quad \text{Equation 16}$$

where $f_{r_n}(t,k)$, $f_{f_d}(t,k)$, and $f_{SINR}(t,k)$ are functions of measured or computed interference, Doppler spread and SINR, respectively.

In various embodiments, the functions $f_{r_n}(t,k)$, $f_{f_d}(t,k)$, and $f_{SINR}(t,k)$ in Equation 16 are given by $$f_{r_n}(t,k)=(1-|d(t,k)|)\cdot\epsilon_1\cdot\rho_1^{\sigma_0-|r_n(t,k)|}+d(t,k)\cdot\epsilon_2\cdot\rho_2^{|\theta_0-\Delta\angle r_n(t,k)|} \quad \text{Equation 17}$$

$$f_{SINR}(t,k)=s(SINR(t,k)-\gamma_0)\cdot\epsilon_3\cdot\rho_3^{|SINR(t,k)-\gamma_0|} \quad \text{Equation 18}$$

$$f_{f_d}(t,k)=s(f_d-\overline{\omega}_0)\cdot\epsilon_4\cdot\rho_4^{|f_d-\overline{\omega}_0|} \quad \text{Equation 19}$$

where $$d(t,k)=s(|r_n(t,k)|-\sigma_0)\cdot\text{sign}(\theta_0-\Delta\angle r_n(t,k)) \quad \text{Equation 20}$$

$$s(x)=(1+\text{sign}(x))/2 \quad \text{Equation 21}$$

$$\rho_i>1>\epsilon_i (i=1,2,3,4) \quad \text{Equation 22}$$

In the equations 17-22 above, $\epsilon_i$ (i=1, 2, 3, 4) are suitable constants less than 1. In an embodiment, a further constraint on the constants $\epsilon_i$ (i=1, 2, 3, 4) is that $\epsilon_2<\epsilon_{i\neq 2}$.

As discussed above, in some embodiments, the client station 25-1 is configured to receive information, such as assistance information, from the base station 14-1 and/or from a higher layer network device, and to adapt the recursive filter coefficient $\alpha$ based on the received assistance information. For example, the assistance information includes one or more of (i) an indication of Doppler spread, (ii) an indication of spatial correlation, and (iii) an indication of an expected level and/or a degree of variance of interference. The network interface 27 is configured to receive the assistance information and to obtain (e.g., retrieve from a memory) an optimal value of the recursive filter coefficient $\alpha$ based on channel characteristics indicated by the assistance information. The network interface 27 is configured to then set the recursive filter coefficient $\alpha$ to the obtained optimal value of the coefficient $\alpha$, in an embodiment.

In addition to, or instead of, obtaining interfering channel characteristics, in some embodiments, the network interface 27 is configured to obtain an error rate associated with transmissions on the communication channel 50, and to adapt the recursive filter coefficient $\alpha$ based on obtained error rate. For example, in an embodiment, the network interface 27 obtains a block error rate (BLER), and adapts the recursive filter coefficient $\alpha$ based on the obtained BLER. In an embodiment the network interface 27 obtains the BLER by measuring or determining a ratio of the number of blocks transmitted to the client station 25-1 that were received by the client station 25-1 with an error (e.g., failed a cyclic redundancy check) to the total number of blocks received by the client station 25-1 in a certain period of time. In an embodiment, the network interface 27 measures or determines the BLER based on first transmissions from the base station 14-1 to the client station 25-1, i.e., the network interface 27 excludes re-transmissions, that typically follow failed transmissions (e.g., when a transmission was received with an error or errors), when measuring or determining the BLER. In other embodiments, the network interface 27 does not exclude retransmissions when measuring or determining BLER. In any event, in an embodiment, a BLER that is relatively high indicates to the network interface 27 that the CQI being generated by the network interface 27 is not sufficiently accurate, in an embodiment. In this case, the network interface 27 increases the value of the recursive filter coefficient $\alpha$ to increase the contribution from past interference measurements and decrease contribution from the current interference measurement, in an embodiment. Conversely, a BLER that is relatively low indicates to the network interface 27 that the CQI being generated by the network interface 27 is sufficiently accurate, in an embodiment. In this case, the network interface 27 leaves the value the recursive filter coefficient $\alpha$ unchanged or, alternatively, decreases the recursive filter coefficient α to decrease the contribution from past interference measurements and increase contribution from the current interference measurement, in an embodiment.

In an embodiment, the network interface 27 is configured to determine a difference between the obtained BLER and a target BLER, and to compare the difference between the obtained BLER and the target BLER to a threshold value X. The network interface 27 is configured to then adapt the recursive filter coefficient α based on the comparison of the difference between the obtained BLER and the target BLER to the threshold value X. For example, in an embodiment, the network interface 27 is configured to adapt the recursive filter coefficient according to $$\alpha(t+1, k) = \begin{cases} \min(\alpha(t, k) + \alpha_{step}, \alpha_{max}) & BLER(t) - BLER_{target} > X \\ \max(\alpha(t, k) - \alpha_{step}, \alpha_{min}) & BLER(t) - BLER_{target} < -X \\ \alpha(t, k) & |BLER(t) - BLER_{target}| < X \end{cases} \quad \text{Equation 23}$$

where X corresponds to a predetermined threshold. In this embodiment, the network interface 27 increases the value of the recursive filter coefficient α when the difference between the obtained BLER and the target BLER is greater than X, decreases the value of the recursive filter coefficient α when the difference between the obtained BLER and the target BLER is less than negative X, and leaves the recursive filter coefficient α unchanged when the difference between the obtained BLER and the target BLER is less than X.

In another embodiment, the network interface 27 is configured to utilize a continuous function to adapt the recursive filter coefficient α based on the obtained BLER. For example, in an embodiment, the network interface 27 is configured to adapt the recursive filter coefficient according to $$\alpha(t+1) = \max(\min(\alpha(t) + f(t), \alpha_{max}), \alpha_{min}) \quad \text{Equation 24}$$

where $$f(t) = \text{sign}(BLER - BLER_{target}) \cdot \epsilon \cdot (1+\delta)^{|BLER(t) - BLER_{target}|} \quad \text{Equation 25}$$

where δ is a constant greater than 0 and ε is a constant less than 1, in an embodiment.

Figure 3:
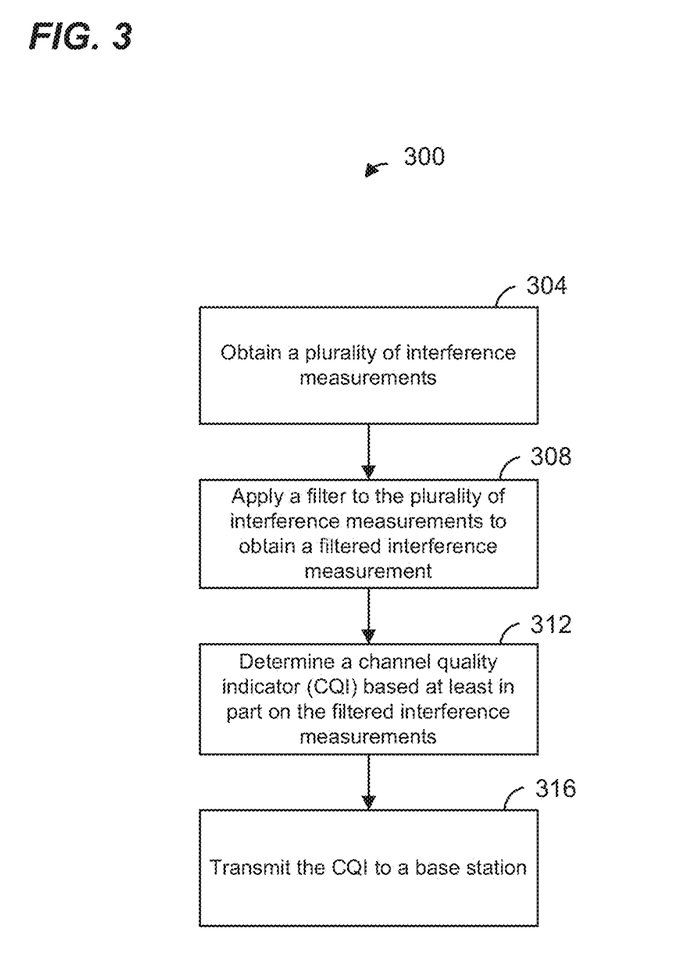
FIG. 3 is a flow diagram of an example method for determining a channel quality indicator (CQI) based at least in part on a filtered measurement of interference, according to an embodiment.

FIG. 3 is a flow diagram of an example method 300 for determining a CQI based at least in part on a filtered interference measurement, according to an embodiment. The method 300 is implemented at least partially by the network interface 27 of the client station 25-1, in an embodiment. In other embodiments, the method 300 is implemented by another suitable communication device.

At block 304, a plurality of interference measurements are obtained at a client station.

At block 308, a filter is applied to the plurality of interference measurements to obtain a filtered interference measurement. In an embodiment, the filter interference measurement is a function of a current interference measurement and one or more past interference measurements. In an embodiment a recursive filter having a recursive filter coefficient is applied at block 308. For example, a recursive filter corresponding to Equation 6 is applied at block 308, in an embodiment. In another embodiment, a recursive filter corresponding to Equation 7 is applied at block 308. In other embodiments, other suitable filters are applied at block 308.

At block 310, a channel quality indicator is determined based at least in part on the filtered interference measurement obtained at block 308. At block 312, the CQI is transmitted to the base station. The base station receives the CQI and utilizes the CQI to determine communication parameters for communicating with the client station, for example, in an embodiment.

In some embodiments, the method 300 further includes adapting filter coefficients used for filtering the interference measurements at block 308. For example, the method 300 includes adapting a recursive filter coefficient α based on a determined interfering channel scenario indicative of reliability of interference measurements and/or based on obtained error rate, as discussed above, in various embodiments.

Additionally, further aspects of the present invention relates to one or more of the following clauses.

In an embodiment, a method includes obtaining, at a first communication device, a plurality of interference measurements corresponding to interference experienced by the first communication device. The method also includes applying a filter to the plurality of interference measurements to obtain a filtered interference measurement, wherein the filtered interference measurement is a function of a current interference measurement and one or more past interference measurements. The method additionally includes determining, based at least in part on the filtered interference measurement, a channel quality indicator (CQI) corresponding to a communication channel between the first communication device and a second communication device. The method further includes transmitting the CQI from the first communication device to the second communication device.

In other embodiments, the method includes any suitable combination of one or more of the following features.

Applying the filter to the plurality of interference measurements to obtain a filtered interference measurement comprises applying a recursive filter having an associated recursive filter coefficient.

The method further includes determining an interfering channel scenario related to reliability of interference measurements at the first communication device, and adapting the recursive filter coefficient based on the interfering channel scenario.

Determining the interfering channel scenario is based on one or more factors including one or more of (i) interfering channel Doppler spread, (ii) signal to noise plus interference ratio (SINR) at the first communication device, (iii) interfering channel spatial correlation, (iv) level of interference relative to desired signal at the first communication device, and (v) degree of variance of interference at the first communication device.

Adapting the recursive filter coefficient based on the interfering channel scenario comprises one of (i) increasing a value of the recursive filter coefficient or (ii) decreasing the value of the recursive filter coefficient to adjust the value of the recursive filter coefficient towards an optimal value corresponding to the interfering channel scenario.

Adapting the recursive filter coefficient comprises incrementing or decrementing the recursive filter coefficient by a value of a step size.

Adapting the recursive filter coefficient comprises updating the recursive filter coefficient based on a continuous function of the one or more factors.

Determining the interfering channel scenario includes performing channel measurements at the first communication device.

Determining the interfering channel scenario includes receiving assistance information from a higher level control device.

The method further comprises determining a block error rate (BLER) corresponding to transmissions on the communication channel, and adapting the recursive filter coefficient based on the BLER.

In another embodiment, a first communication device comprises a network interface device configured to obtain a plurality of interference measurements corresponding to interference experienced by the first communication device. The network interface is further configured to apply a filter to the plurality of interference measurements to obtain a filtered interference measurement, wherein the filtered interference measurement is a function of a current interference measurement and one or more past interference measurements. The network interface is further still configured to determine, based at least in part on the filtered interference measurement a channel quality indicator (CQI) associated with a communication channel between the first communication device and a second communication device. The network interface is further yet configured to transmit the CQI from the first communication device to the second communication device.

In other embodiments, the first communication device includes any suitable combination of one or more of the following features.

The network interface is configured to apply, to the plurality of interference measurements, a recursive filter having an associated recursive filter coefficient.

The network interface is further configured to determine an interfering channel scenarios related to reliability of interference measurements at the first communication device, and adapt the recursive filter coefficient based on the interfering channel scenario.

The network interface is configured to determine the interfering channel scenario based on one or more factors including one or more of (i) interfering channel Doppler spread, (ii) signal to noise plus interference ratio (SINR) at the first communication device, (iii) interfering channel spatial correlation, (iv) level of interference relative to desired signal at the first communication device, and (v) degree of variance of interference at the first communication device.

The network interface is configured to (i) increase a value of the recursive filter coefficient or (ii) decrease the value of the recursive filter coefficient to adjust the value of the recursive filter coefficient towards an optimal value corresponding to the interfering channel scenario.

The network interface is configured to (i) increment or (ii) decrement the recursive filter coefficient by a value of a step size.

The network interface is configured to adapt the recursive filter coefficient by updating the recursive filter coefficient based on a continuous function of the one or more factors.

The network interface is configured to determine the interfering channel scenario at least by performing interfering channel measurements at the first communication device.

The network interface is configured to receive assistance information from a higher level control device, and determine the interfering channel scenario based on the received assistance information.

The network interface is further configured to determine a block error rate (BLER) corresponding to transmissions on the communication channel, and adapt the recursive filter coefficient based on the BLER.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any tangible, non-transitory computer readable memory such as a magnetic disk, an optical disk, a random access memory, a read only memory, a flash memory, etc. The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), a programmable logic device, etc.

While various embodiments have been described with reference to specific examples, which are intended to be illustrative only and not to be limiting, changes, additions and/or deletions may be made to the disclosed embodiments without departing from the scope of the claims.

What is claimed is:

1. A method, comprising:
  obtaining, at a first communication device, a plurality of interference measurements corresponding to interference experienced by the first communication device;
  applying a recursive filter to the plurality of interference measurements to obtain a filtered interference measurement, the recursive filter having an associated recursive filter coefficient;
  determining, based at least in part on the filtered interference measurement, a channel quality indicator (CQI) corresponding to a communication channel between the first communication device and a second communication device;
  transmitting the CQI from the first communication device to the second communication device;
  determining an interfering channel scenario related to reliability of interference measurements at the first communication device; and
  adapting the recursive filter coefficient based on the interfering channel scenario, including incrementally stepping a value of the recursive filter coefficient towards a predetermined optimal value corresponding to the interfering channel scenario.

2. The method of claim 1, wherein determining the interfering channel scenario is based on one or more factors including one or more of (i) interfering channel Doppler spread, (ii) signal to noise plus interference ratio (SINR) at the first communication device, (iii) interfering channel spatial correlation, (iv) level of interference relative to desired signal at the first communication device, and (v) degree of variance of interference at the first communication device.

3. The method of claim 1, wherein incrementally stepping the value of the recursive filter coefficient comprises incrementing or decrementing the recursive filter coefficient by a value of a step size.

4. The method of claim 1, wherein incrementally stepping the value of the recursive filter coefficient comprises updating the recursive filter coefficient based on a continuous function of one or more factors related to the interference experience by the first communication device.

5. The method of claim 1, wherein determining the interfering channel scenario includes performing interfering channel measurements at the first communication device.

6. The method of claim 1, wherein determining the interfering channel scenario includes receiving assistance information from a higher level control device.

7. The method of claim 1, further comprising:
determining a block error rate (BLER) corresponding to transmissions on the communication channel; and
adapting the recursive filter coefficient based on the BLER.

8. A first communication device, comprising:
a network interface device configured to
obtain a plurality of interference measurements corresponding to interference experienced by the first communication device;
apply a recursive filter to the plurality of interference measurements to obtain a filtered interference measurement, the recursive filter having an associated recursive filter coefficient,
determine, based at least in part on the filtered interference measurement a channel quality indicator (CQI) associated with a communication channel between the first communication device and a second communication device,
transmit the CQI from the first communication device to the second communication device,
determine an interfering channel scenario related to reliability of interference measurements at the network interface device, and
adapt the recursive filter coefficient based on the interfering channel scenario, including incrementally stepping a value of the recursive filter coefficient towards a predetermined optimal value corresponding to the interfering channel scenario.

9. The first communication device of claim 8, wherein the network interface device is configured to determine the interfering channel scenario based on one or more factors including one or more of (i) interfering channel Doppler spread, (ii) signal to noise plus interference ratio (SINR) at the first communication device, (iii) interfering channel spatial correlation, (iv) level of interference relative to desired signal at the first communication device, and (v) degree of variance of interference at the first communication device.

10. The first communication device of claim 8, wherein the network interface device is configured to (i) increment or (ii) decrement the recursive filter coefficient by a value of a step size.

11. The first communication device of claim 8, wherein the network interface device is configured to incrementally step the value of the recursive filter coefficient by updating the recursive filter coefficient based on a continuous function of one or more factors related to the interference experienced by the first communication device.

12. The first communication device of claim 8, wherein the network interface device is configured to determine the interference channel scenario at least by performing interfering channel measurements at the first communication device.

13. The first communication device of claim 8, wherein the network interface device is configured to:
receive assistance information from a higher level control device; and
determine the interfering channel scenario based on the received assistance information.

14. The first communication device of claim 8, wherein the network interface device is further configured to:
determine a block error rate (BLER) corresponding to transmissions on the communication channel; and
adapt the recursive filter coefficient based on the BLER.

* * * * *